US011186686B2

(12) United States Patent
Skov et al.

(10) Patent No.: US 11,186,686 B2
(45) Date of Patent: Nov. 30, 2021

(54) SILICONE ELASTOMERS AND THEIR PREPARATION AND USE

(71) Applicant: Danmarks Tekniske Universitet, Kgs. Lyngby (DK)

(72) Inventors: Anne Ladegaard Skov, Frederiksberg (DK); Søren Hvilsted, Hørsholm (DK); Piotr Stanislaw Mazurek, Virum (DK)

(73) Assignee: Danmarks Tekniske Universitet, Kgs. Lyngby (DK)

( * ) Notice: Subject to any disclaimer, the term of this patent is extended or adjusted under 35 U.S.C. 154(b) by 0 days.

(21) Appl. No.: 15/577,081

(22) PCT Filed: May 27, 2016

(86) PCT No.: PCT/EP2016/061974
§ 371 (c)(1),
(2) Date: Nov. 27, 2017

(87) PCT Pub. No.: WO2016/189117
PCT Pub. Date: Dec. 1, 2016

(65) Prior Publication Data
US 2018/0179340 A1 Jun. 28, 2018

(30) Foreign Application Priority Data

May 27, 2015  (EP) .................................... 15169435
Dec. 14, 2015  (EP) .................................... 15199838

(51) Int. Cl.
*C08L 83/04* (2006.01)
*C08J 3/09* (2006.01)
*C08G 77/18* (2006.01)
*C08J 9/06* (2006.01)
*C08J 9/00* (2006.01)
*C08K 5/053* (2006.01)

(52) U.S. Cl.
CPC .............. *C08J 3/095* (2013.01); *C08G 77/18* (2013.01); *C08J 9/0023* (2013.01); *C08J 9/06* (2013.01); *C08K 5/053* (2013.01); *C08J 2201/026* (2013.01); *C08J 2207/12* (2013.01); *C08J 2383/04* (2013.01)

(58) Field of Classification Search
CPC ................................. C08K 5/053; C08L 83/04
See application file for complete search history.

(56) References Cited

U.S. PATENT DOCUMENTS

| 4,252,709 A * | 2/1981 | Skostins .................. C08K 3/38 524/386 |
| 4,499,224 A * | 2/1985 | Anthony ................ C08G 77/34 524/261 |
| 4,555,545 A * | 11/1985 | Kimura ................ C09D 183/04 524/588 |
| 6,333,364 B2 | 12/2001 | Meguriya et al. |
| 8,591,873 B1 | 11/2013 | O'Lenick |
| 2001/0016609 A1 | 8/2001 | Meguriya et al. |
| 2003/0130363 A1* | 7/2003 | Meguriya ............... B29C 67/20 521/54 |
| 2004/0070316 A1 | 4/2004 | Neubauer et al. |
| 2010/0143421 A1 | 6/2010 | Van Reeth et al. |
| 2010/0196322 A1 | 8/2010 | Migneco et al. |
| 2010/0210770 A1 | 8/2010 | Nadeau et al. |
| 2013/0236730 A1 | 9/2013 | Bose et al. |
| 2013/0345317 A1 | 12/2013 | Chiou |
| 2015/0307759 A1* | 10/2015 | Bordoloi .................. C08K 5/41 524/56 |

FOREIGN PATENT DOCUMENTS

| CN | 101747630 | 6/2010 |
| EP | 0407834 | 1/1991 |
| JP | 2007106946 | 4/2007 |
| WO | WO08052568 | 5/2008 |
| WO | WO2008095479 | 8/2008 |
| WO | WO2012020068 | 2/2012 |
| WO | WO2013192004 | 12/2013 |
| WO | WO2015043792 | 4/2015 |

OTHER PUBLICATIONS

Technical Information Data Sheet "Laboratory Mixers Model L5M-A" from www.silverson.com, 2021.*
XP-002744065, WPI database, Thomson Scientific, London, GB, Week 200736, AN 2007-382994.
XP-002744064. WPI database, Thomson Scientific, London, GB, Week 201055, AN2010-J67625.
Mazurek, P. et al., "Novel encapsulation technique for incorporation of high permittivity fillers into silicone elastomers", Proceedings of SPIE, retrieved from the Internet on Aug. 20, 2021, https://doi.org/10.1117/12.2044778, (2014).

* cited by examiner

Primary Examiner — Margaret G Moore
(74) Attorney, Agent, or Firm — McHale & Slavin, P.A.

(57) ABSTRACT

The present invention relates to an elastomeric composition comprising a silicone rubber, glycerol, at least one cross-linking agent, and optionally one or more excipients, wherein said glycerol is present as discrete droplets in the silicone rubber, obtainable through the application of high shear forces.

32 Claims, 7 Drawing Sheets

SILICONE ELASTOMERS AND THEIR PREPARATION AND USE

CROSS REFERENCE TO RELATED APPLICATIONS

This is a national stage filing in accordance with 35 U.S.C. § 371 of PCT/EP2016/061974, filed May 27, 2016, which claims the benefit of the priority of European Patent Application No. 15169435.3, filed May 27, 2015, and European Patent Application No. 15199838.2, filed Dec. 14, 2015, the contents of each are incorporated herein by reference.

FIELD OF THE INVENTION

The present invention relates to an elastomeric composition comprising a silicone rubber, glycerol, and at least one crosslinking agent, wherein said glycerol is present as discrete droplets in the silicone rubber, obtainable through the application of high shear forces.

BACKGROUND OF THE INVENTION

Silicone elastomers are very versatile and are broadly applied due to their flexibility, solvent and wear resistance, high thermal stability, high gas permeability, low surface tension and chemical and biological inertness amongst other favorable properties. Silicone elastomers, such as in particular polydimethylsiloxane (PDMS), thus find application as e.g. adhesives, membranes, dielectric elastomers and biomedical applications. Due to the many excellent properties of silicone elastomers it would be of great interest to extend the range of applications even further and to lower its cost of production.

Non-toxic, energy saving, biodegradable elastomers made from recycled materials or renewable resources have become one of main targets of modern industry. A perspective of shortage in oil motivates the material industry to look into innovative sources of materials. An ideal alternative to traditionally synthesized monomers seems to be substrates of natural origin. Therefore an extensive investigation of the usefulness of biobased monomers as well as natural fillers (e.g. fibers) is successfully being conducted. Large extensibility of these elastomers is a very unique property that requires an uncompromised balance of physical and chemical properties in elastomers structure.

US 2010/210770 A1 relates to an elastomeric composite comprising a synthetic rubber which incorporates a biofiller.

WO 08/052568 A1 relates to a method of producing an article comprising an interpenetrating polymer network (IPN) comprising i) providing a polymer substrate and applying it in a reaction chamber, ii) providing at least one monomer for an interpenetrating polymer, iii) exposing said polymer substrate in said reaction chamber to said at least one monomer in the presence of an impregnation solvent comprising CO2 under conditions wherein said CO2 is in its liquid or supercritical state and iv) polymerizing said at least one monomer to form an interpenetrating polymer in the presence of a polymerization solvent under conditions wherein at least a part of said at least one monomer is dissolved in said polymerization solvent, said method optionally comprising cross-linking of the interpenetrating polymer.

US 2001/016609 A1 relates to silicone rubber compositions having blended therein an organic resin fine hollow filler or an organic resin fine filler adapted to expand into a hollow filler upon heating.

DATABASE WPI, WEEK 201055, THOMSON SCIENTIFIC, LONDON, GB: AN 2010-J67625 & CN 101 747 630 A relates to a room temperature vulcanized silicone rubber composition comprising organopolysiloxane, reinforced filling material, electrical erosion resistant stabilizer, auxiliary agent and diluting agent.

DATABASE WPI, WEEK 200736, THOMSON SCIENTIFIC, LONDON, GB: AN 2007-382994 & JP 2007 106946 A relates to a room temperature hardenable polyorganosiloxane composition comprising polyorganosiloxane, fumed silica, organic polyol compound, cross-linking agent and curing catalyst.

There is still a need for developing so-called "green" elastomers, i.e. an elastomer incorporating a biobased filler without comprising its mechanical properties and while lowering its costs.

OBJECT OF THE INVENTION

It is an object of embodiments of the invention to provide an elastomeric composition having a green profile by incorporating a biobased material in a silicone rubber while maintaining uncompromised mechanical properties of the resulting elastomeric composition.

It is a further object of embodiments of the invention to provide an elastomeric composition obtainable at reduced costs.

It is a further object of embodiments of the invention to provide an elastomeric composition having high dielectric permittivity while maintaining a low conductivity.

It is a further object of embodiments of the invention to provide an expanded elastomeric composition having a density well below 1 $g/cm^3$, thereby resulting in a low density foam having excellent heat/sound insulation properties. Further the closed cell foam obtained provides excellent and robust mechanical properties.

It is a further object of embodiments of the invention to provide an elastomeric composition having a high water vapour transmission rate. A high water transmission rate is favourable in applications such as skin adhesives or membranes in contact with skin where sweat can then be transported away from the skin.

SUMMARY OF THE INVENTION

It has been found by the present inventor(s) that glycerol, a waste residue from biodiesel production, has a great potential for preparation of a new wave of green polymers and may be incorporated in silicone elastomers at large loadings without compromising its mechanical properties.

So, in a first aspect the present invention relates to an elastomeric composition comprising a silicone rubber, glycerol, at least one crosslinking agent, and optionally one or more excipients, wherein said glycerol is present as discrete droplets in the silicone rubber, and wherein said discrete droplets of glycerol are obtained through the application of shear at a level of about 1000 rpm to about 5000 rpm of a mixture of a silicone rubber, glycerol, at least one crosslinking agent and optionally one or more excipients.

In a second aspect the present invention relates to a method of producing an elastomeric composition according to any one of the preceding claims, comprising:
  i. Providing a silicone rubber;
  ii. Providing glycerol;
  iii. Providing at least one crosslinking agent;
  iv. Optionally providing one or more excipients and optionally one or more additives;

v. Mixing the silicone rubber, the at least one crosslinking agent, the glycerol, and optionally one or more excipients and optionally one or more additives through the application of shear at a level of about 1000 rpm to about 5000 rpm; and vi. curing the mixture obtained in v).

In a third aspect the present invention relates to a use of the elastomeric composition according to the invention as electroactive polymer.

In a fourth aspect the present invention relates to a use of the elastomeric composition according to the invention as a silicone rubber foam.

LEGENDS TO THE FIGURE

FIG. 1 shows SEM images of cross-sections of cured glycerol-PDMS composites according to example 1. A—10 phr, B—50 phr, C—90 phr, D—130 phr of glycerol. Scale bars at all images correspond to 10 μm;

DETAILED DISCLOSURE OF THE INVENTION

Definitions

Figure 1:
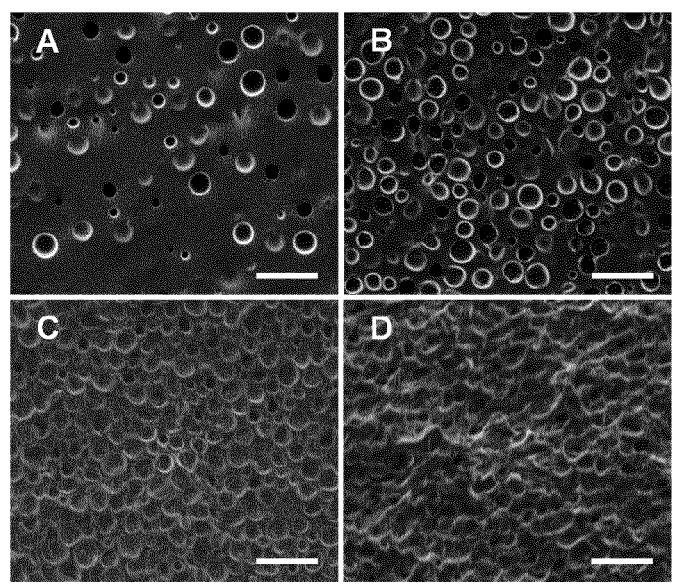

In the present context the term "silicone rubber" refers to a polymer that includes any inert compound made up of repeating units of siloxane of the formula —RR'SiO—, wherein R and R' are identical or different hydrocarbon groups.

In the present context the term "polysiloxane" refers to a compound of the form [RR'SiO]$_n$, wherein R and R' are identical or different hydrocarbon groups, and wherein n is the number of repeating units. The term "polysiloxane" also refers to a compound of the form [RR'SiO]$_n$, which may be partly functionalized in the sense that some R, R' groups have been replaced by or substituted with substituent groups. Non-limiting examples of such substituent groups include Cl, CN, F, S, NH$_2$, OH, alkenyl, and alkynyl.

In the present context the term "polydimethylsiloxane", abbreviated "PDMS", refers to a compound of the formula CH$_3$[Si(CH$_3$)$_2$O]$_n$Si(CH$_3$)$_3$, where n is the number of repeating units. The term "polydimethylsiloxane" encompasses derivatives thereof, such as hydroxy-, vinyl-, -allyletc. end-capped PDMS.

In the present context the term "curing" refers to the process of cross-linking of polymer chains.

In the present context the terms "crosslinker" and "crosslinking agent" are used interchangeably and refer to a chemical compound facilitating the crosslinking of the silicone polymer chains.

In the present context the term "phr" used for describing glycerol content in all compositions corresponds to glycerol weight amount per hundred weight parts of silicone rubber.

In the present context the term "free-standing thin film" refers to a thin film in which at least a part of the film is not in contact with a support material. A typical thickness range of a "free-standing thin film" is about 0.1-100 micron, such as about 0.5-10 micron, such as about 1 micron.

In the present context the term "electroactive" in relation to polymers refers to polymers that exhibit a change in size or shape when stimulated by an electric field. A characteristic property of an electroactive polymer (EAP) is that the polymer will undergo a large amount of deformation while sustaining large forces.

Specific Embodiments of the Invention

In an embodiment of the elastomeric composition according to the invention the glycerol is present in the silicone rubber at a ratio of glycerol:silicone rubber of 0.1-1.5 by weight (corresponding to 10-150 phr).

It has surprisingly been found that glycerol may be incorporated in the silicone rubber at high loadings while maintaining the presence of glycerol as discrete droplets in the silicone rubber to provide an elastomeric composition in the form of a free-standing thin film and without compromising the mechanical properties of the resulting elastomeric composition.

In an embodiment of the elastomeric composition according to the invention said glycerol is present at a ratio of glycerol:silicone rubber of 0.2-1.4 by weight (corresponding to 20-140 phr), such as a ratio of 0.3-1.2 by weight (corresponding to 30-120 phr), such as 0.4-1.0 by weight (corresponding to 40-100 phr), such as 0.5-0.8 by weight (corresponding to 50-80 phr).

In an embodiment of the elastomeric composition according to the invention the silicone rubber is selected from the group consisting of silicone rubber, chlorosilicone rubber and fluorosilicone rubber.

In an embodiment of the elastomeric composition according to the invention the silicone rubber is selected from the group consisting of polyalkylsiloxanes, preferably polydimethylsiloxane (PDMS) and derivatives thereof. Exemplary PDMS rubbers include vinyl-functional PDMS crosslinkable with hydride-functional crosslinking agents or hydroxyl-functional PDMS crosslinkable in the presence of Sn. Non-limiting examples of commercially available PDMS rubbers include Sylgard® 184 from Dow Corning and Elastosil® RT625 from Wacker Chemie, Germany.

In an embodiment of the invention the silicone rubber is a chlorosilicone rubber. Non-limiting examples of suitable chlorosilicone rubbers are compositions from Chloromethyl terminated PolyDimethylsiloxanes (e.g. DMS-L21 from Gelest) or chlorosilicone rubbers as disclosed in WO 2015/043792.

In an embodiment of the invention the silicone rubber is a fluorosilicone rubber. Non-limiting examples of commercially available fluorosilicone rubbers are of the Silastic® F-LSR range of elastomers from Dow Corning, the FE/FEA series from ShinEtsu Silicones or the Elastosil® FLR series from Wacker Chemie.

In an embodiment of the invention the elastomeric composition further comprises one or more excipients selected from the group consisting of catalysts, inhibitors, flow agents, silicone oils, solvents, fillers, blowing agents, reinforcing substances, and plasticizers.

In an embodiment of the invention said excipient is selected from the group consisting of catalysts, such as Pt complexes (addition curing), Sn (condensation curing), peroxide (peroxide curing) and inhibitors, such as divinyltetramethyldisiloxane and 1,3,5,7-tetravinyl-1,3,5,7-tetramethylcyclotetrasiloxane. Examples of commercially available inhibitors are SID4613.0 (1,3-divinyltetramethyldisiloxane) and SIT7900.0 (1,3,5,7-tetravinyl-1,3,5,7-tetramethylcyclotetrasiloxane) from Gelest Inc.

In an embodiment of the invention the elastomeric composition may further comprise an excipient selected from the group consisting of fillers, reinforcing substances, and plasticizers, such as e.g. plasticizer oils to reduce the melt viscosity of the rubber during its processing, for example, mineral oils containing known quantities of paraffinic, naphthenic and aromatic molecules, active fillers (e.g. zinc oxide and stearic acid), inactive fillers (such as carbon black, titanium dioxide, silica, carbonates, kaolin, clay and talc), or resins such as Vinyl Q resins from Gelest Inc. Such excipients may be present in a commercially available silicone rubber or may be added to the silicone rubber separately. The amount of excipient necessary will vary widely depending on the elastomeric composition in question but usually is in the range 0-40% by weight, such as 5-30% by weight, such as 10-25% by weight of the elastomeric composition.

In an embodiment of the invention the elastomeric composition may further comprise an excipient selected from the group consisting of flow agents, silicone oils and solvents. Commercially available examples thereof include silicone oil WACKER® AK SILICONE FLUID or a solvent such as OS-20 from Dow Corning®.

In an embodiment of the invention the elastomeric composition comprises as excipient at least one blowing agent.

In an embodiment of the invention the at least one blowing agent is present in an amount in the range 1-10 phr, such as 2-8 phr, such as 3-6 phr, such as about 5 phr.

In an embodiment of the invention the blowing agent is a base. Non-limiting examples thereof include inorganic bases such as NaOH, KOH, and LiOH; amine based compounds, such as triethanolamine, ethanolamine, triethylamine, ethylamine, methylamine, polyetheramines (such as JeffAmines® commercially available from Huntsman); and phosphazene bases such as BEMP (2-tert-Butylimino-2-diethylamino-1,3-dimethylperhydro-1,3,2-diazaphosphorine), and P1-t-Bu (N,N,N',N',N'',N''-Hexamethyl-N''''-(2-methyl-2-propanyl)phosphorimidic triamide).

In a particular embodiment of the invention the blowing agent is NaOH. It has thus surprisingly been found that the addition of NaOH in small amounts as indicated above provides rapid foaming and a foam having small uniform air voids.

In an embodiment the elastomeric composition according to the invention further comprises one or more additives. Depending on the additive in question and its hydrophilic/hydrophobic properties said additive will be present either in solution or dispersion in the glycerol droplets or in the silicone rubber or in both.

In an embodiment of the elastomeric composition according to the invention said one or more additives are selected from the group consisting of colouring substances, pharmaceutical substances, magnetic substances such as e.g. iron, ferrite and magnetite, tracer substances such as fluorescent particles and molecules, labelled molecules (e.g. deuterated) etc. One or more additives may be added in order to impart particular properties to the elastomeric composition, such as colouring, or in order to provide e.g. therapeutical properties, or in order to allow controlled release of a pharmaceutical substance.

In an embodiment of the invention the elastomeric composition possesses a dielectric permittivity at 1 Hz of at least 3.5, preferably at least 5, such as at least 7.5. Thereby is obtained an enhanced actuator performance.

In an embodiment of the invention the method for preparing an elastomeric composition comprises a step of mixing of the silicone rubber, the at least one crosslinking agent, the glycerol and optionally one or more excipients and optionally one or more additives comprises preparing a silicone premix comprising the silicone rubber and the at least one crosslinking agent; preparing a glycerol premix optionally comprising one or more excipients and optionally one or more additives; and mixing said silicone premix and said glycerol premix through the application of shear at a level of about 1000 rpm to about 5000 rpm.

In an embodiment of the invention the method for preparing an elastomeric composition comprises a step of preparing a silicone premix comprising the silicone rubber and the at least one crosslinking agent; preparing a glycerol premix comprising glycerol and at least one excipient in the form of a blowing agent; and mixing said silicone premix and said glycerol premix.

In an embodiment of the invention the blowing agent is a base, preferably a strong base such as NaOH. It has surprisingly been found that when NaOH is used as a blowing agent, a very efficient blowing of the elastomeric composition is achieved resulting in an expanded silicone rubber foam.

In an embodiment of the invention the silicone rubber foam is an expanded elastomeric composition having a specific gravity in the range of 0.05-0.5 g/cm$^3$, such as 0.1-0.4 g/cm$^3$, such as 0.1-0.3 g/cm$^3$, such as 0.1-0.25 g/cm$^3$.

Curing of the silicone rubber may take place as known in the art.

In an embodiment of the method according to the invention curing takes place in the form of addition-based curing, such as by the use of Pt as a catalyst, wherein Si—H groups of the crosslinking agent react with vinyl groups of the silicone polymer.

In another embodiment of the method according to the invention curing takes place in a condensation-based system, such as through the use of a Sn-based curing system and a room-temperature vulcanizing silicone rubber, wherein an alkoxy crosslinker experiences a hydrolysis step and is left with a hydroxyl group participating in a condensation reaction with another hydroxyl group attached to the polymer in question.

In another embodiment of the method according to the invention curing takes place in a peroxide-based system, wherein an organic peroxide compound decomposes at elevated temperatures to form reactive radicals that chemically crosslink the polymer chains. A commercially available crosslinking agent is ELASTOSIL® AUX curing agent C1 from Wacker AG.

In an embodiment of the method according to the invention the mixing in step v) is performed at a shear level of about 1500 rpm to about 4000 rpm, such as about 2000 rpm to about 3500 rpm. Through the application of high shear it has surprisingly been found that it is possible to uniformly distribute high amounts of a hydrophilic glycerol within a hydrophobic silicone rubber and form a stable glycerol-in-silicone emulsion. The mixture may be cured over a broad range of temperatures and may subsequently be stored over a long time without evaporation of liquid phase.

In an embodiment of the method according to the invention curing takes place through the application of energy, preferably wherein said energy is heat or radiation. Whereas application of energy may not be necessary, in particular not for room-temperature vulcanizing silicone rubber, heating may accelerate the curing process.

EXPERIMENTAL

Materials

Two component Sylgard 184 silicone kit (S184), i.e. divinylterminated polydimethylsiloxane comprising a crosslinker as well as a Pt catalyst with silica as reinforcing agent, was purchased from Dow Corning. Glycerol (food grade) being a byproduct from biodiesel production was provided by Emmelev A/S and was used as received avoiding excessively long contact with air.

Methods

A dual asymmetric centrifuge SpeedMixer DAC 150 FVZ-K was used for mixing of all compounds. A Leica DM LB optical microscope was applied for investigation of glycerol in silicone emulsion morphology. Viscosities of investigated prepolymer formulations were determined with the help of Ares AR2000ex rheometer from TA Instruments. FEI Inspect S scanning electron microscope was used in order to obtain images of cross-sections of cured specimen. Samples were gold-sputtered prior to testing in order to obtain higher quality images. ATR-FTIR spectra of composite cross-sections were obtained with the help of Nicolet iS50 FT-IR spectrometer. Tensile tests were performed on Instron 4301 universal tester at room temperature at a strain rate of 500 mm/min as implied by ASTM D412-C standards. Conductivity of samples was investigated with a Novocontrol broadband dielectric spectrometer. 20 mm of diameter and 1 mm thick disc samples were tested in the frequency range between $10^6$ and $10^{-1}$ Hz. Water wettability of polymers was investigated with the help of DataPhysics OCA20. Samples were tested using the sessile drop method, and the average water contact angle was calculated from at least three measurements.

Example 1

A Sylgard 184 silicone kit was mixed in ratio 10:1 by weight as recommended by the manufacturer. Subsequently the desired amount of glycerol was added to PDMS and stirred with the help of the speed-mixer for 5 minutes at 3500 r.p.m. unless mentioned otherwise. Amounts of incorporated glycerol by mass with corresponding volume fractions are presented in Table 1. Volume fractions were calculated based on densities available in literature which were 1.03 g/cm3 and 1.26 g/cm3 for Sylgard 184 and glycerol, respectively. After the mixing step, all compositions were casted onto a metal mould with a 1 mm spacer and cured at 80° C. for 1 hour. Obtained films were then left at room temperature for at least two days for eventual post-curing to take place. Samples for tensile tests were prepared according to ASTM D412-C standards. Mixed formulations were casted onto a PMMA plate with a 3 mm spacer. After curing, the samples were cut with a custom-made die.

TABLE 1

Glycerol - PDMS formulations with corresponding volume fractions.

| Sample name | Amount of glycerol [phr] | Volume fraction of glycerol in the sample |
| --- | --- | --- |
| G0_S184 | 0 | 0 |
| G10_S184 | 10 | 0.071 |
| G20_S184 | 20 | 0.133 |
| G30_S184 | 30 | 0.188 |
| G40_S184 | 40 | 0.236 |
| G50_S184 | 50 | 0.278 |
| G60_S184 | 60 | 0.316 |
| G70_S184 | 70 | 0.350 |
| G80_S184 | 80 | 0.381 |
| G90_S184 | 90 | 0.409 |
| G100_S184 | 100 | 0.435 |
| G110_S184 | 110 | 0.459 |
| G120_S184 | 120 | 0.480 |
| G130_S184 | 130 | 0.500 |
| G140_S184 | 140 | 0.519 |

FIG. 1 shows SEM images of cross-sections of cured glycerol-PDMS composites, wherein A—10 phr, B—50 phr, C—90 phr, D—130 phr of glycerol and a crosslinker as well as a Pt catalyst with silica as reinforcing agent. Scale bars at all images correspond to 10 μm.

Figure 2:
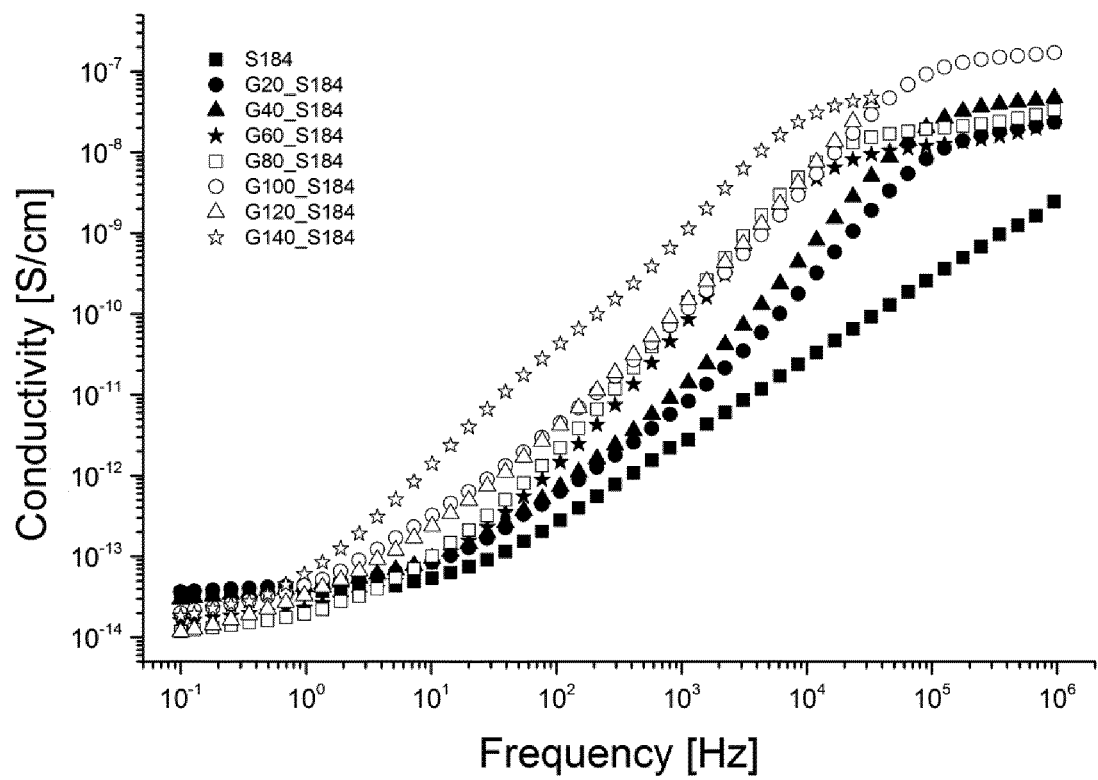
FIG. 2 shows conductivity of various glycerol-PDMS compositions according to example 1 presented as a function of frequency.

Conductivity of the compositions was tested. Broadband dielectric spectroscopy tests showed that samples having ≤120 phr of glycerol did not result in any significant increase in conductivity (see FIG. 2).

Figure 3:
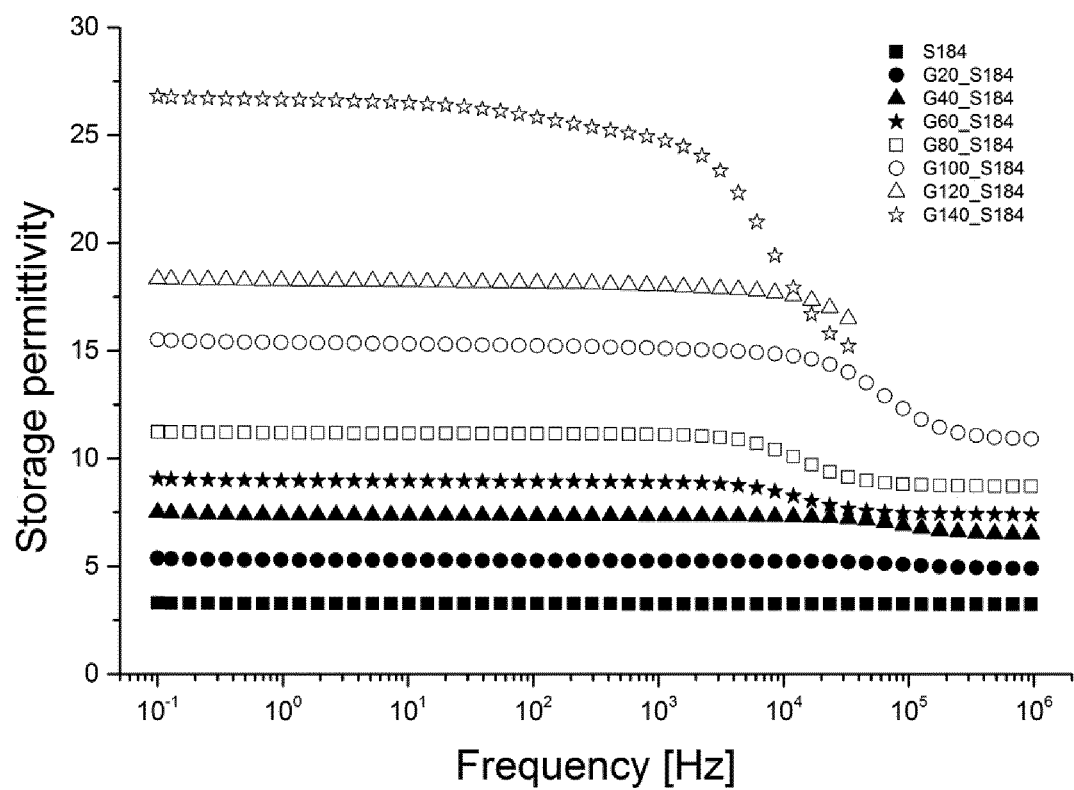
FIG. 3 shows storage permittivity of various glycerol-PDMS compositions according to example 1 presented as a function of frequency.

Storage permittivity, also termed dielectric permittivity, was also tested by broadband dielectric spectroscopy at room temperature. All samples had significant enhancement of the dielectric constant without a substantial increase in dielectric loss except when an increased conductivity of samples occurs, i.e. above 120 phr as discussed above, see FIG. 3.

The mechanical behaviour of the above samples was also tested. Sylgard 184 was investigated for reference. Five specimens from each composition were tested and average values were calculated and used for evaluation of mechanical properties of the material. Values of tensile modulus of elasticity and stresses and strains at break are listed in Table 2.

TABLE 2

Mechanical properties of various glycerol - Sylgard 184 compositions obtained from tensile measurements.

| Sample | Tensile modulus of elasticity [MPa] | | Strain at break [%] | Stress at break [MPa] |
| --- | --- | --- | --- | --- |
| | Tangent | Secant (at 100% strain) | | |
| S184 | 1.068 | 3.663 | 153.7 | 8.289 |
| G20_S184 | 0.800 | 2.583 | 160.1 | 6.193 |
| G40_S184 | 0.576 | 1.763 | 165.9 | 4.600 |
| G60_S184 | 0.514 | 1.548 | 167.8 | 4.038 |
| G80_S184 | 0.429 | 1.316 | 160.5 | 3.172 |
| G100_S184 | 0.376 | 1.137 | 159.0 | 2.705 |
| G120_S184 | 0.327 | 0.972 | 115.8 | 1.303 |

Example 2

Preparation of Condensation Type PDMS—Glycerol Composites
Reactants Used:
1. PDMS:
   a. Dihydroxyl terminated linear PDMS FD6 produced by SIKA Technology AG, Germany with molecular weight of 31.000 g/mol;
   b. Trimethoxy DMS based crosslinker, Methyl Trimethoxy Silane, MTMS, produced by SIKA Technology AG, Germany with molecular weight of 136.11 g/mol;
   c. Tin based Catalyst SK designed for condensation type PDMS systems produced by SIKA Technology AG, Germany;
2. Food grade glycerol provided by Emmelev A/S, Denmark.

Sample Preparation:

PDMS FD6 and MTMS crosslinking agent were mixed in a molar ratio of reactive groups of r=5 (quotient of molar amount of methoxy groups of MTMS and hydroxyl groups of FD6). 3000 ppm of tin catalyst was added to the system. The formulation of all three compounds was mixed using a dual asymmetric centrifuge SpeedMixer DAC 150 FVZ-K for 2 minutes at 2000 r.p.m. Subsequently the desired amount of glycerol was added to the PDMS pre-mixture and speed-mixed for 5 minutes at 3500 r.p.m. 20-80 phr (20 phr steps) of glycerol were added to PDMS.

The obtained glycerol-in-PDMS emulsions were casted onto a metal mould with 1 mm thick spacer and left overnight at room temperature for the condensation reaction to take place.

The produced emulsions were investigated with the help of a Leica DM LB optical microscope. Emulsions with 20-80 phr of glycerol were stable at room temperature for extensive amounts of time. Glycerol droplet size (average droplet diameter) was estimated to be around 10 µm.

Figure 4:
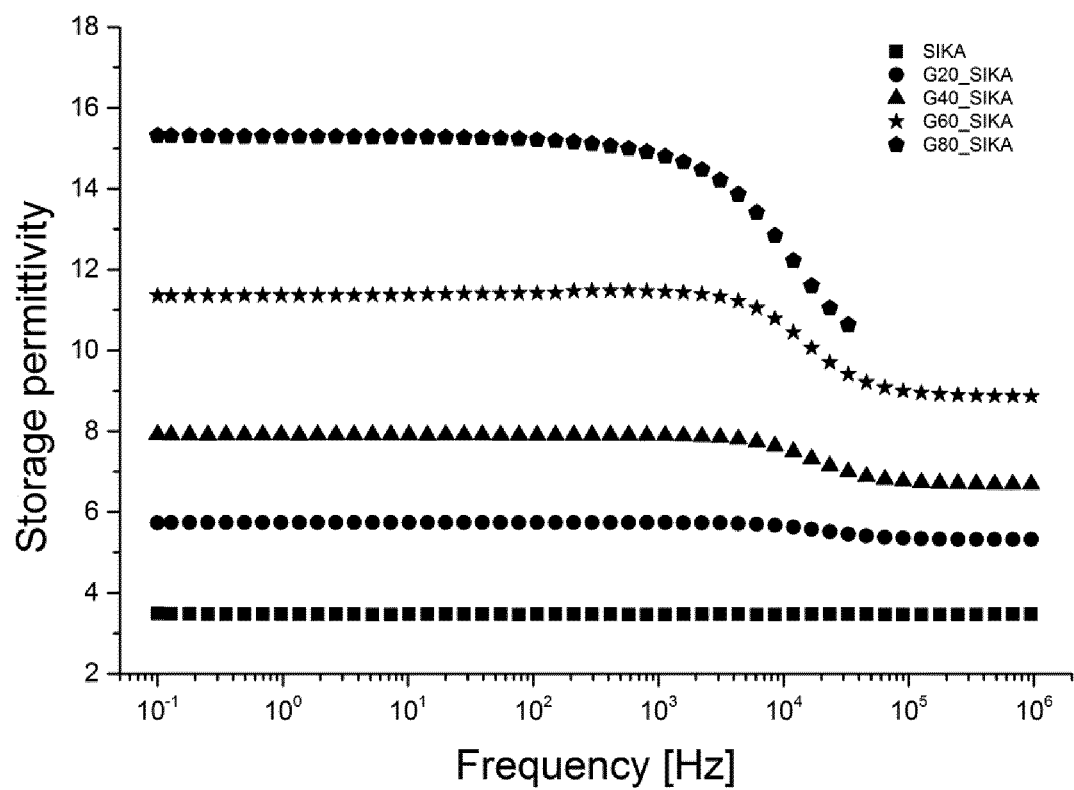
FIG. 4 shows storage permittivity of various glycerol-PDMS compositions according to example 2 presented as a function of frequency.

Storage permittivity was tested analogously with the test in example 1. Results can be seen in FIG. 4.

Example 3

PDMS Foams
All compositions were speed-mixed at 3500 r.p.m. for 2 minutes prior to curing;

Example 4

Figure 5:
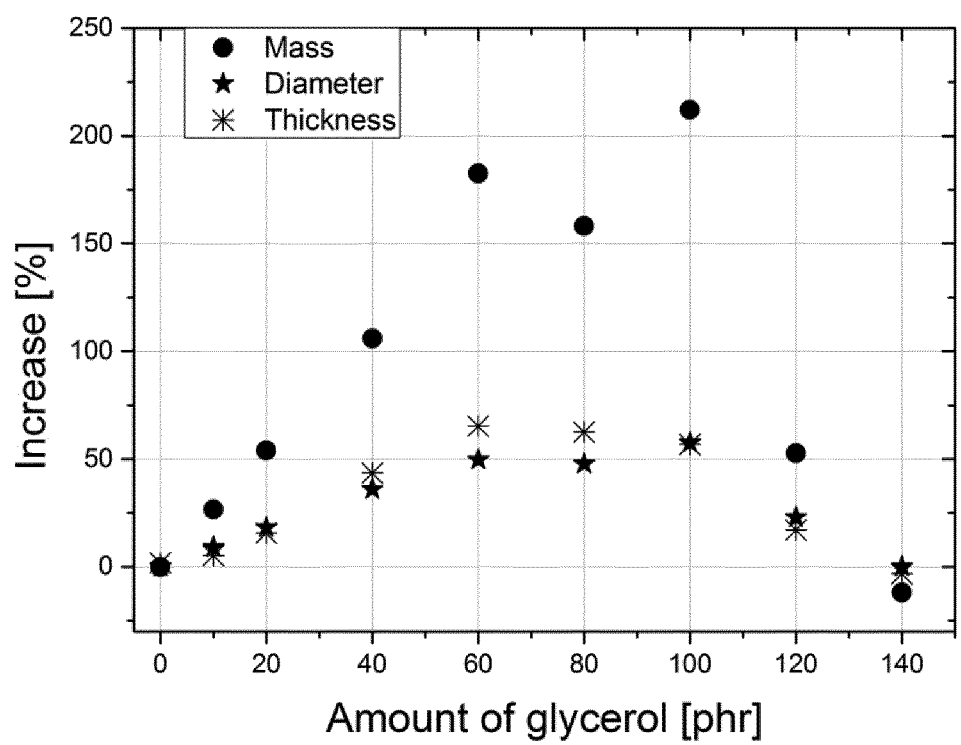
FIG. 5 shows dimensional changes of various glycerol-PDMS compositions according to example 1.
Figure 6:
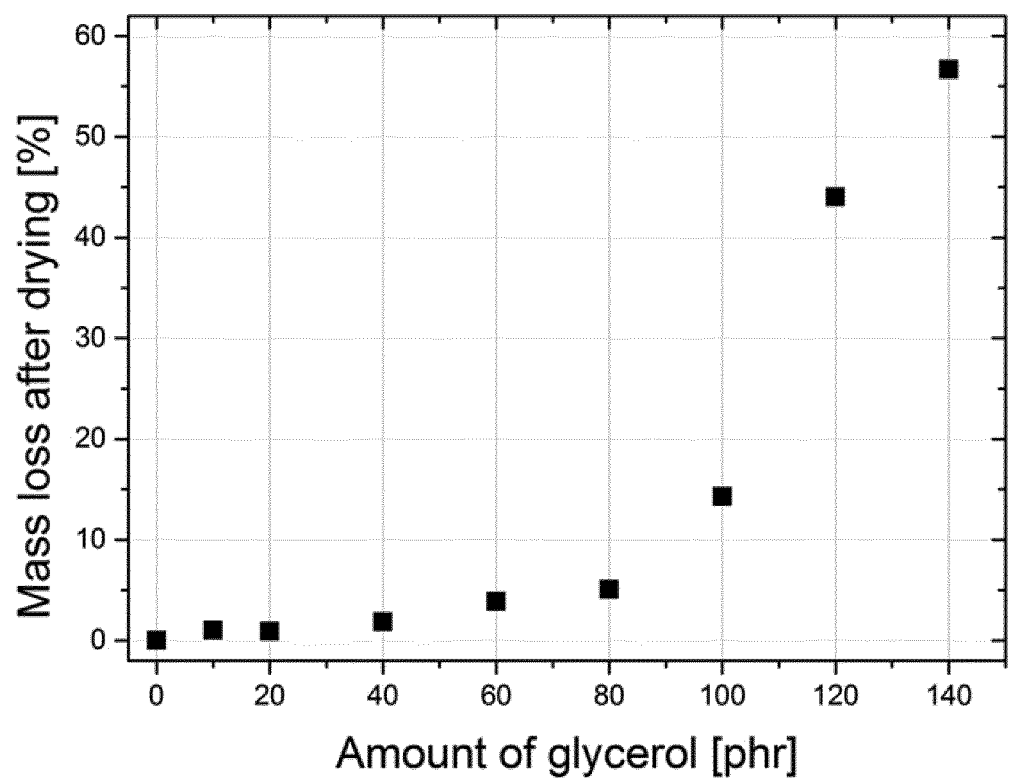
FIG. 6 shows mass loss after swelling and drying of various glycerol-PDMS compositions according to example 1.

Water absorption experiments were performed by immersing the samples prepared in example 1 in water. Samples were of size 25 mm diameter and approximately 1 mm thick, and the samples were weighed and measured before the immersion. Each sample was immersed in deionized water for 24 h, after that the mass, thickness and diameter were measured for each sample. Samples were subsequently vacuum dried for 3 days after which the mass, thickness and diameter of each sample was measured. The dimensional changes of the elastomer samples are shown in FIG. 5. The mass loss after swelling and drying is shown in FIG. 6.

Example 5

Below is shown ratios of water transmission rates (WVTR) for different samples. The sample preparation is described in example 1. The numbers are normalized with the result of Sylgard 184. The figure shows the absolute numbers from tests with two different thicknesses of the silicone rubber.

| S184 | G40_S184 (40 phr glycerol) | G80_S184 (80 phr glycerol) | G120_S184 (120 phr glycerol) |
|---|---|---|---|
| 1 | 1.66 | 1.96 | 3 |

Figure 7:
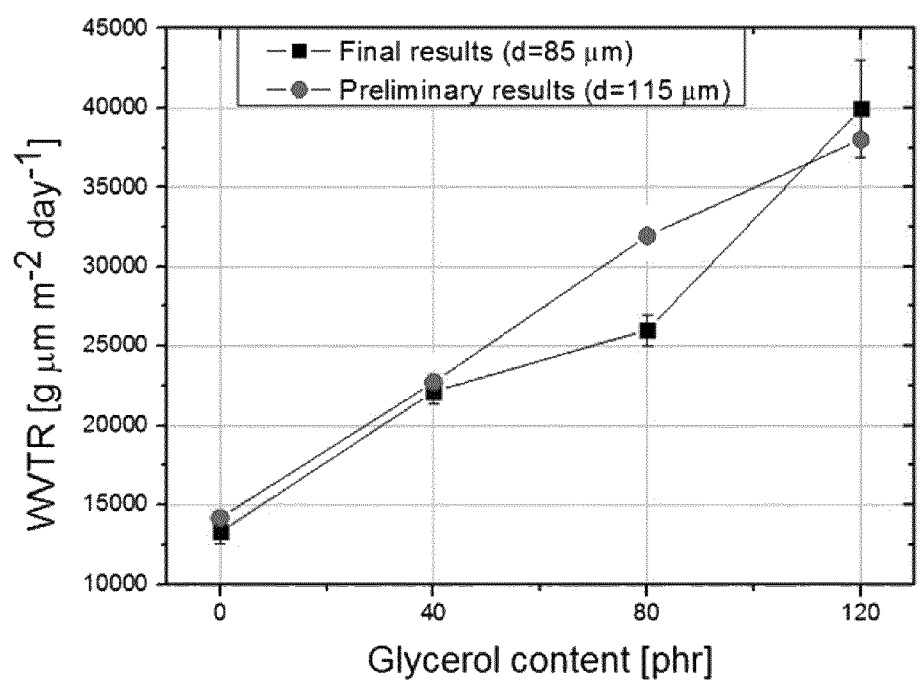
FIG. 7 shows water vapour transmission rates of various glycerol-PDMS compositions according to example 1 as a function of glycerol content.

The results are shown in FIG. 7.

LIST OF REFERENCES

US 2010/210770 A1
WO 08/052568 A1
US 2001/016609 A1
DATABASE WPI, WEEK 201055, THOMSON SCIENTIFIC, LONDON, GB: AN 2010-J67625 & CN 101 747 630 A
DATABASE WPI, WEEK 200736, THOMSON SCIENTIFIC, LONDON, GB: AN 2007-382994 & JP 2007 106946 A

The invention claimed is:
1. A cured elastomeric composition comprising a silicone rubber, glycerol, at least one crosslinking agent, and option-

| PDMS used | Liquid used | Amount of the liquid [phr] | Base | Wt. % of base in the liquid | Curing temp. [° C.] | Foaming/density |
|---|---|---|---|---|---|---|
| S184 | Glycerol | 60 | NaOH | 5 | 80 | Yes/0.9 |
| S184 | Glycerol | 100 | NaOH | 5 | 80 | Yes/0.35 |
| S184 | Glycerol | 140 | NaOH | 5 | 80 | Yes/0.6 |
| S184 | Glycerol | 60 | NaOH | 3 | 80 | Yes/0.6 |
| S184 | Glycerol | 100 | NaOH | 3 | 80 | Yes/0.3 |
| S184 | Glycerol | 140 | NaOH | 3 | 80 | Yes/0.5 |
| S184 | Glycerol | 60 | NaOH | 5 | 120 | Yes/0.7 |
| S184 | Glycerol | 100 | NaOH | 5 | 120 | Yes/0.25 |
| S184 | Glycerol | 140 | NaOH | 5 | 120 | Yes/0.5 |
| S184 | Glycerol | 100 | JEFFAMINE_D400* | 10 | 80 | Yes/0.5# |
| S184 | Glycerol | 100 | JEFFAMINE_D2000** | 10 | 80 | Yes/0.5# |
| S184 | Glycerol | 100 | JEFFAMINE_ED2003*** | 10 | 80 | Yes/0.5# |

*D-400 - polyetheramine based on poly(propylene glycol), (MW = 430)
**D-2000 - polyetheramine based on poly(propylene glycol), (MW = 2000)
***ED-2003 - polyetheramine based on poly(ethylene glycol) (predominantly) and poly(propylene glycol), (MW = 430)
estimated value ally one or more excipients, wherein said glycerol is present as discrete droplets of uniformly distributed glycerol in the silicone rubber, said discrete droplets of glycerol having been sheared at a level of about 1500 rpm to about 4000 rpm of a mixture of a silicone rubber, glycerol, at least one crosslinking agent and optionally one or more excipients to provide a stable glycerol-in-silicone emulsion, and wherein said glycerol is present at a ratio of glycerol:silicone rubber of 20-140 phr of said cured elastomeric composition.

2. The cured elastomeric composition according to claim 1, wherein the silicone rubber is selected from the group consisting of silicone rubber, chlorosilicone rubber and fluorosilicone rubber.

3. The cured elastomeric composition according to claim 1, wherein the silicone rubber is selected from the group consisting of polyalkylsiloxanes.

4. The cured elastomeric composition according to claim 1, further comprising one or more excipients selected from the group consisting of catalysts, inhibitors, flow agents, silicone oils, solvents, fillers, blowing agents, reinforcing substances, and plasticizers.

5. The cured elastomeric composition according to claim 4, comprising as an excipient at least one blowing agent in an amount in the range 1-10 phr.

6. The cured elastomeric composition according to claim 5, wherein the blowing agent is NaOH.

7. The cured elastomeric composition according to claim 1, further comprising one or more additives.

8. The cured elastomeric composition according to claim 7, wherein said one or more additives are selected from the group consisting of colouring substances, pharmaceutical substances, magnetic substances and tracer substances.

9. The cured elastomeric composition according to claim 1, having a dielectric permittivity at 1 Hz of at least 3.5.

10. A method of producing a cured elastomeric composition according to claim 1, comprising:
  i. Providing a silicone rubber;
  ii. Providing glycerol, said glycerol is present at a ratio of glycerol:silicone rubber of 20-140 phr;
  iii. Providing at least one crosslinking agent;
  iv. Optionally providing one or more excipients and optionally one or more additives;
  v. Mixing the silicone rubber, the at least one crosslinking agent, the glycerol and optionally one or more excipients and optionally one or more additives through the application of shear at a level of about 1500 rpm to about 4000 rpm; and
  vi. curing the mixture obtained in v).

11. The method according to claim 10, wherein step v) comprises preparing a silicone premix comprising the silicone rubber and the at least one crosslinking agent; preparing a glycerol premix optionally comprising one or more excipients and optionally one or more additives; and mixing said silicone premix and said glycerol premix through the application of shear at a level of about 1500 rpm to about 4000 rpm.

12. The method according to claim 10, wherein curing takes place through the application of energy.

13. The method according to claim 10, wherein step v) comprises preparing a silicone premix comprising the silicone rubber and the at least one crosslinking agent; preparing a glycerol premix comprising glycerol and at least one excipient in the form of a blowing agent; and mixing said silicone premix and said glycerol premix.

14. The method according to claim 13, wherein said blowing agent is NaOH.

15. The cured elastomeric composition according to claim 1 wherein said composition is an electroactive polymer.

16. The cured elastomeric composition according to claim 1 wherein said composition is a silicone rubber foam.

17. The cured elastomeric composition according to claim 16, wherein the silicone rubber foam is an expanded elastomeric composition having a specific gravity in the range of 0.05-0.5 $g/cm^3$.

18. The cured elastomeric composition according to claim 1, wherein said glycerol is present at a ratio of glycerol:silicone rubber of 30-120 phr.

19. The cured elastomeric composition according to claim 1, wherein said glycerol is present at a ratio of glycerol:silicone rubber of 40-100 phr.

20. The cured elastomeric composition according to claim 1, wherein said glycerol is present at a ratio of glycerol:silicone rubber of 50-80 phr.

21. The cured elastomeric composition according to claim 3, wherein said polyalkylsiloxanes are polydimethylsiloxane (PDMS) and hydroxy-, vinyl-, or allyl-end-capped PDMS.

22. The cured elastomeric composition according to claim 5, wherein said one blowing agent is in an amount in the range of 2-8 phr.

23. The cured elastomeric composition according to claim 4, wherein said one blowing agent is in an amount in the range of 3-6 phr.

24. The cured elastomeric composition according to claim 4, wherein said one blowing agent is in an amount of about 5 phr.

25. The cured elastomeric composition according to claim 9, having a dielectric permittivity at 1 Hz of at least 5.

26. The cured elastomeric composition according to claim 9, having a dielectric permittivity at 1 Hz of at least 7.5.

27. The method according to claim 11, wherein said shear level is about 2000 rpm to about 3500 rpm.

28. The method according to claim 12, wherein said energy is heat or radiation.

29. The cured elastomeric composition according to claim 17, wherein the silicone rubber foam is an expanded elastomeric composition having a specific gravity in the range of 0.1-0.4 $g/cm^3$.

30. The cured elastomeric composition according to claim 17, wherein the silicone rubber foam is an expanded elastomeric composition having a specific gravity in the range of 0.1-0.3 $g/cm^3$.

31. The cured elastomeric composition according to claim 17, wherein the silicone rubber foam is an expanded elastomeric composition having a specific gravity in the range of 0.1-0.25 $g/cm^3$.

32. A cured elastomeric composition, being in the form of a closed cell foam, said composition comprising a silicone rubber, glycerol, at least one crosslinking agent, and optionally one or more excipients, wherein said glycerol is present as discrete droplets of uniformly distributed glycerol in the silicone rubber, said discrete droplets of glycerol having been sheared at a level of about 1500 rpm to about 4000 rpm of a mixture of a silicone rubber, glycerol, at least one crosslinking agent and optionally one or more excipients to provide a stable glycerol-in-silicone emulsion, and wherein said glycerol is present at a ratio of glycerol:silicone rubber of 20-140 phr.

* * * * *